United States Patent [19]

Stiefel

[11] 4,282,407
[45] Aug. 4, 1981

[54] TELEPHONE LOOP RESISTANCE DETECTOR

[75] Inventor: Kenneth E. Stiefel, Randolph Township, Morris County, N.J.

[73] Assignee: Bell Telephone Laboratories, Incorporated, Murray Hill, N.J.

[21] Appl. No.: 85,025

[22] Filed: Oct. 15, 1979

[51] Int. Cl.³ .......................... H04G 1/30; H04M 3/00
[52] U.S. Cl. ........................... 179/18 FA; 179/16 EA; 179/16 F
[58] Field of Search ................ 179/16 F, 16 H, 16 A, 179/16 AA, 16 AE, 16 EA, 18 F, 18 FA, 18 EB, 18 HB, 84 R, 1 SW, 170 R, 170 E

[56] References Cited

U.S. PATENT DOCUMENTS

| 3,339,027 | 8/1967 | Feiner et al. | 179/16 F |
| 3,403,228 | 9/1968 | Zebe | 179/16 F |
| 3,671,676 | 6/1972 | Henry et al. | 179/16 F |
| 3,784,756 | 1/1974 | Nemchik | 179/16 F |
| 3,801,837 | 4/1974 | Pease et al. | 179/16 EA |
| 3,816,668 | 6/1974 | Giesken | 179/16 F |
| 4,056,688 | 11/1977 | Stiefel | 179/16 F |

Primary Examiner—Thomas A. Robinson
Attorney, Agent, or Firm—Robert O. Nimtz

[57] ABSTRACT

The disclosure shows a telephone range extender which is automatically adaptable to the length of the connected subscriber loop. A loop resistance detector within the range extender discriminates between loops within a plurality of ranges of lengths. For extremely short loops not requiring range extension, the range extender circuits are disconnected from the loop. For intermediate length loops, the gain of a bidirectional voice frequency amplifier is set at a low value to provide just sufficient gain for these loops. For longer loops, the gain of the amplifier is increased to provide sufficient amplification for the longer range. For extremely long loops, the range extender is disconnected since such loops must be served by remote amplification facilities. An automatic range extender of this type is shown connected behind the first stage of the central office switch in order to concentrate range extenders on a larger plurality of subscriber loops.

10 Claims, 9 Drawing Figures

BIDIRECTIONAL AMPLIFIER

LOOP VOLTAGE DETECTOR

RINGING DETECTOR

CENTRAL OFFICE VOLTAGE DETECTOR

THREE LEVEL DETECTOR

POWER SUPPLY

CONCENTRATED RANGE EXTENSION

TELEPHONE LOOP RESISTANCE DETECTOR

BACKGROUND OF THE INVENTION

1. Field of the Invention

This invention relates to telephone subscriber loop length detection and, more particularly, to the automatic detection of the resistance of telephone subscriber loops.

2. Description of the Prior Art

In order to provide telephone service on very long subscriber loops, it is often necessary to provide voice frequency gain and supervisory signal detectors at the central office end of the subscriber loop. Such specialized facilities are called "range extenders with gain" (REGs). One such range extender is shown in K. E. Stiefel U.S. Pat. No. 4,056,688, granted Nov. 1, 1977. The need for range extension of any particular subscriber loop is dependent upon the resistance of that loop. Short loops, for example, do not require range extension while very long loops cannot be serviced entirely from the central office end and usually require remote amplification units. A range extender which is automatically adaptable to any length of line is particularly desirable since the loop parameters need not be investigated for each loop prior to installation. One such automatically adjusting range extender is disclosed in the aforementioned patent of the present applicant.

In order to provide automatic adjustment to the length of the connected subscriber loop, it is customary to detect the level of current flow in the loop since such current flow is an indirect measure of the resistance, and hence the length, of the subscriber loop. In the presence of changing central office voltages or voltage reversals at the central office, such current detectors may become inoperative or may indicate an erroneous length of the loop. Providing separate current detectors for each polarity of central office voltage is expensive and does not guarantee accurate detection of subscriber loop length.

Other problems with prior art loop current detectors include sensitivity to power delivered from the loop by wire crosses. Moreover, such current detectors are also used to indicate the off-hook and dial pulsing conditions. During dial pulsing, the capacitance of the connected subscriber loop modifies the waveshape of the dial pulses considerably and renders the detection of dial pulse transitions difficult. Similarly, the detection of a loop current in the presence of high magnitude alternating current ringing signals presents a serious problem for such current detectors.

SUMMARY OF THE INVENTION

In accordance with the present invention, both the loop current in the subscriber loop and the voltage across the subscriber loop are detected. Signals representing these values are used to detect the resistance of the connected subscriber loop independent of the magnitude or polarity of the voltage applied to that loop. In this way, the detection circuits are made independent of the central office voltage and, indeed, provide consistent indications even in the presence of rapid changes in that voltage.

In accordance with one feature of the present invention, the resistance detection circuitry is arranged to be insensitive to power delivered from the loop and to respond only to power delivered to the loop from the central office. Erroneous indications which would otherwise result from power crosses in the loop are avoided.

In accordance with another feature of the present invention, the switching circuits for inserting and removing the range extender circuits from the subscriber loop are implemented by relay contacts. In order to provide delayed hysteresis in the operate and release characteristics of these relays, a transistor driver circuit includes a capacitor connected as a Miller integrator to delay the operate and release times of the relay.

DETAILED DESCRIPTION

Figure 1:
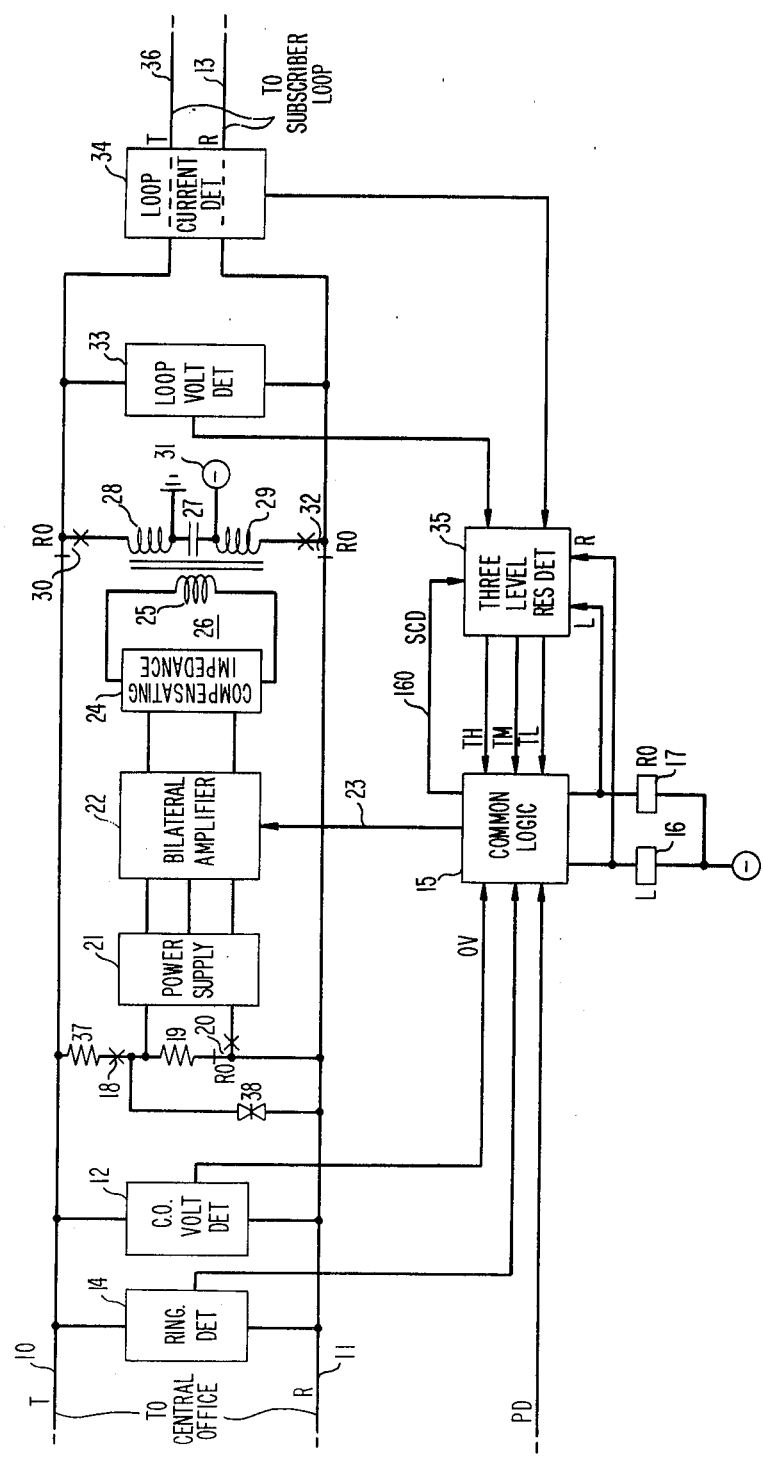
FIG. 1 is a general block diagram of a range extender with gain in accordance with the present invention.

Referring more particularly to FIG. 1, there is shown a range extender connected between the central office appearances of tip conductor 10 and ring conductor 11 and the subscriber loop appearances of tip conductor 36 and ring conductor 13. A ringing signal detector 14 is connected between tip conductor 10 and ring conductor 11 at the office side of the range extender. Similarly, a central office voltage detector 12 is connected between tip conductor 10 and ring conductor 11. The outputs of detectors 12 and 14 are applied to a common logic circuit 15 which responds to these outputs and to various other signal conditions to control the operation of a line (L) relay 16 and a range extender operate (RO) relay 17. When operated, L relay 16 closes L contacts 18 to connect a load resistor 19 between tip conductor 10 and ring conductor 11. When operated, RO relay 17 operates transfer contacts 20, 30 and 32 to connect the range extender circuits into the loop between conductors 10-11 and conductors 36-13.

Power supply 21 is operated from the central office voltage and generates supply voltages of the proper magnitudes to operate the electronic circuits in the bilateral amplifier 22. Tip conductor 10 and ring conductor 11 are connected through power supply 21 to bilateral amplifier 22. Amplifier 22 provides amplification of voice frequency signals traveling in either direction and can provide such amplification at either one of two gain levels, under the control of a signal on automatic gain control (AGC) lead 23. The right-hand signal path from amplifier 22 is connected through a compensating impedance 24 to the primary winding 25 of transformer 26.

Transformer 26 has two secondary windings 28 and 29 separated by a capacitor 27. One end of winding 28 is connected to ground potential while the other end is arranged to be connected by RO transfer contacts 30 to the subscriber tip conductor 36. Similarly, winding 29 has one end connected to a negative voltage source 31 which may, for example, comprise a boosted battery supply, and the other end connected through RO transfer contacts 32 to ring conductor 13 of the subscriber loop. It can be seen that RO contacts 30 and 32 switch subscriber loop conductors 36 and 13 from a direct connection to central office conductors 10 and 11, respectively, to the bilateral amplification path including power supply 21, amplifier 22, impedance 24 and transformer 26.

A loop voltage sensor 33 is connected between tip conductor 26 and ring conductor 13. A loop current sensor 34 is coupled to loop conductors 36 and 13. Sensors 33 and 34 provide outputs to a three-level resistance detector 35. A current sensor suitable for use as senser 34 is shown in the copending application of J. L. Henry, Ser. No. 061,463, filed July 27, 1979. Using the indication of line voltage from sensor 33 and the indication of loop current from sensor 34, resistance detector 35 distinguishes between three separate and distinct levels of subscriber loop resistance, for convenience, identified as a high, a medium, and a low resistance threshold. Control signals indicating loop resistance crossing these thresholds are supplied to common logic circuit 15.

The range extender shown in block form in FIG. 1 operates as follows. When connected to a particular subscriber loop (leads 36 and 13), the range extender measures the loop resistance (via sensors 33 and 34 and detector 35). L relay 16 and RO relay 17 are operated in response to suitable loop resistance between conductors 36 and 13. The operation of RO relay 17 indicates the subscriber has gone off-hook and hence amplification of the voice signals is required. L relay 16 follows dial pulses, represented by interrupted current flow in conductors 36 and 13, and repeats these dial pulses to the central office by terminating central office conductors 10 and 11 with the amplifier 22 in approximate synchronism with dial pulses. For subscriber loops having a resistance exceeding a medium threshold (TM), logic circuit 15 produces a signal on control lead 23 to shift the gain of amplifier 22 from 3 decibels to 6 decibels. For loop resistances exceeding a high threshold (TH), it is assumed that the subscriber loop is an open circuit (ON-HOOK) and both L relay 16 and RO relay 17 are released. For loop resistances less than a low threshold (TL), it is assumed that the subscriber loop is sufficiently short that range extension is not necessary. Under this condition, L relay 16 and RO relay 17 are likewise released and signals can flow between conductors 10 and 11 and conductors 36 and 13 without traversing the amplifications path provided by amplifier 22.

Figure 9:
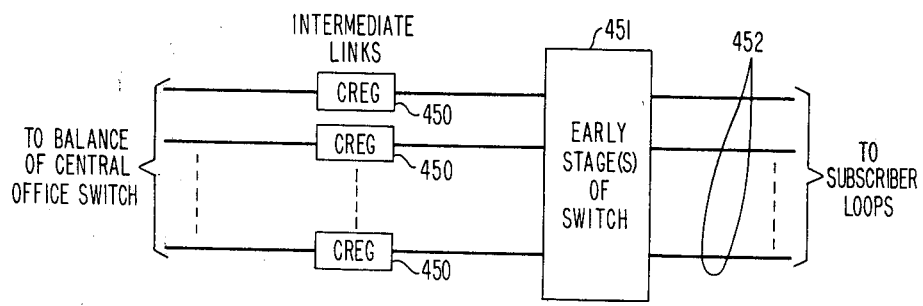
FIG. 9 is a general block diagram of the manner in which range extenders, such as that shown in FIG. 1, can be placed inside of a telephone central office switch to provide shared range extension of a large plurality of telephone subscriber loops.

The importance of the arrangement shown in FIG. 1 is readily apparent if it is assumed that the range extender is connected behind the first stage or stages of switching in the telephone central office, as shown in FIG. 9. When used in this way, it is not known what length of subscriber loop will be connected to the range extender at any given time. The range extender is therefore constructed to automatically respond to the measured loop resistance by providing an appropriate amplifier gain or, for short loops, to bypass the range extender altogether. With the concentration provided by the central office switch, it is unnecessary to provide a range extender for each subscriber loop. Significant economies are obtained by thus concentrating the range extension function within the central office switch.

Figure 2:
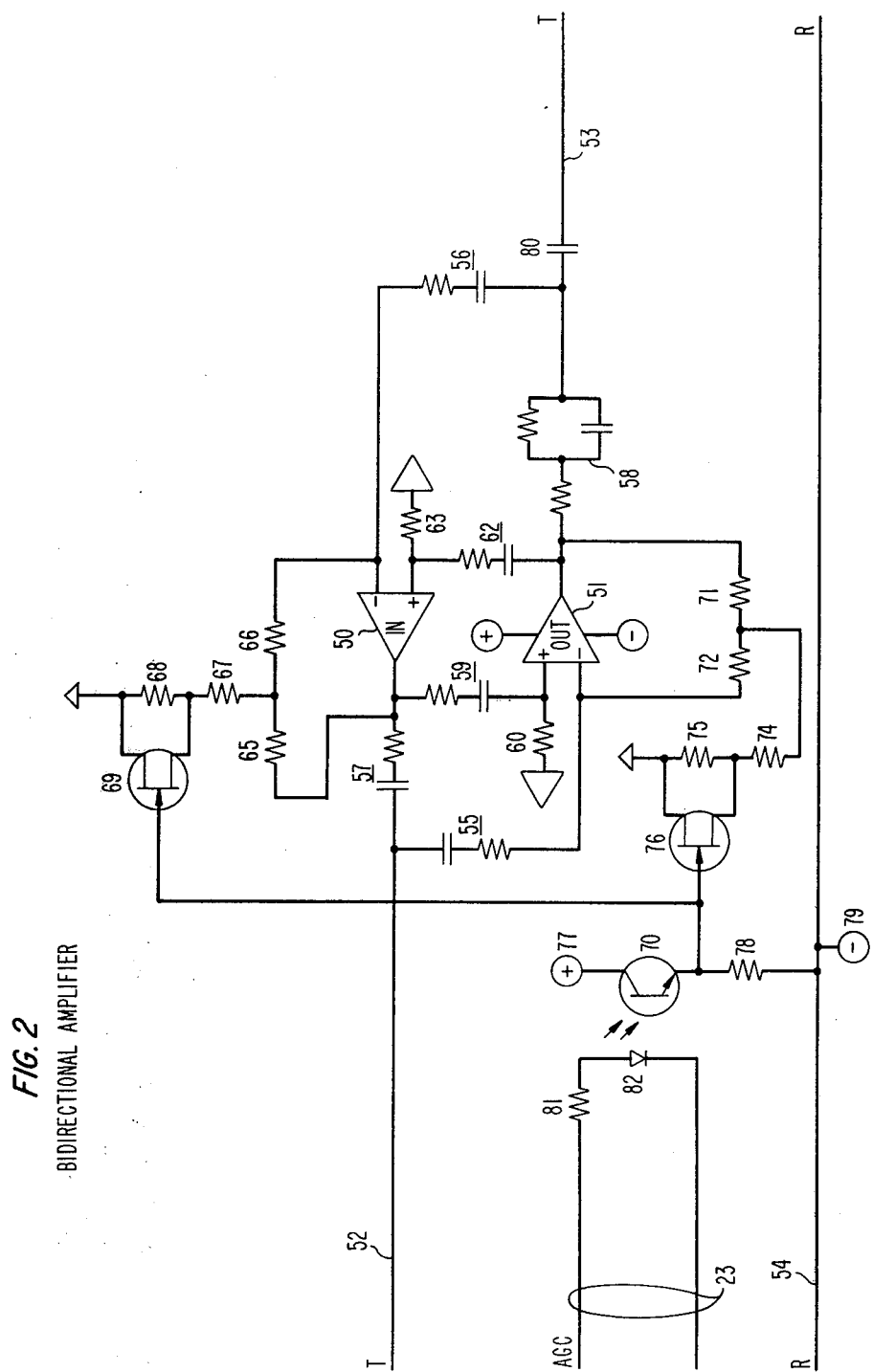
FIG. 2 is a detailed circuit diagram of a variable gain bidirectional amplifier useful in the range extender shown in FIG. 1.

In FIG. 2 there is shown a detailed circuit diagram of the bidirectional amplifier 22 of FIG. 1. The amplifier in FIG. 2 comprises two unidirectional differential amplifiers 50 and 51 each having both a positive and a negative input and a single output. Voice frequency signals arrive from opposite directions on tip conductor 52 and tip conductor 53, respectively, relative to common ring conductor 54. The negative input to amplifier 51 is connected through resistive-capacitive (RC) impedance 55 to tip conductor 52. Similarly, tip conductor 53 is connected through direct current isolating capacitor 80 and RC impedance 56 to the negative input of amplifier 50. The output of amplifier 50 is connected through RC impedance 57 to tip conductor 52. The output of amplifier 51 is connected through RC impedance 58 to tip conductor 53. The output of amplifier 50 is also connected through an RC voltage divider network 59 and 60 to the positive input of amplifier 51. The output of amplifier 51 is connected through RC voltage divider network 62 and 63 to the positive input of amplifier 50. The local ground for these voltage dividers is provided from FIG. 8, to be described hereinafter.

A pair of negative feedback resistors 65 and 66 are connected in series from the output of amplifier 50 to the negative input of amplifier 50. The junction of resistors 65 and 66 is connected through resistors 67 and 68 to ground potential. A field effect transistor (FET) 69 has it major electrodes connected in shunt across resistor 68. The control electrode of FET 69 is connected to the emitter of light detecting transistor 70.

Negative feedback resistors 71 and 72 are connected in series from the output of amplifier 51 to the negative input of amplifier 51. The junction of reistors 71 and 72 is connected through resistors 74 and 75 to ground potential. The major electrodes of FET 76 are connected in shunt across resistor 75. The control electrode of FET 76 is connected to the emitter of photo-detecting transistor 70.

The collector of photo-detecting transistor 70 is connected to positive voltage source 77 while the emitter of transistor 70 is connected through resistor 78 to ring conductor 54, which is also connected to negative voltage source 79. A current appearing on AGC lead 23 is applied through resistor 81 and light-emitting diode (LED) 82. Diode 82 emits light which is detected by transistor 70 to enable the collector-emitter path of transistor 70. The voltage drop across resistor 78 provides a sufficient voltage to enable FETs 69 and 76. Resistors 68 and 75 are thereby effectively removed from the feedback circuit and the voltage divisions in the negative feedback paths around amplifiers 50 and 51 are modified to provide a smaller feedback signal and hence more gain (6 decibels instead of 3 decibels).

In operation, the signals appearing at tip conductors 52 and 53 are bidirectional. The signals derived from amplifier 50 represent the signals traveling from right to left in the circuit. Signals originating at tip conductor 52, traveling from left to right, traverse impedance 55, amplifier 51, impedance 58 and capacitor 80 to tip conductor 53. A portion of the output of amplifier 50 is applied through voltage dividing network 59 and 60 to the positive input of amplifier 51 and is thereby subtracted from the composite signal supplied through impedance 55. The output of amplifier 51 is therefore the difference between these signals and represents only the signal traveling from left to right.

Similarly, the signals at tip conductor 53 are applied through capacitor 80 and impedance 56 to the negative input of amplifier 50. A portion of the output of amplifier 51 is applied through voltage dividing network 62 and 63 to the positive input of amplifier 50 and is thereby subtracted from the composite signal at the negative input of amplifier 50. The output of amplifier 50 is therefore only the signal traveling from right to left, as originally assumed.

The gains of amplifiers 50 and 51 are controlled by the negative feedback paths from their respective outputs to their respective negative inputs. With FETs 69 and 76 in the enabled condition, these gains are set at approximately 6 decibels. When FET switches 69 and 76 are disabled by loss of current on AGC leads 23, the gain of amplifiers 50 and 51 is changed so as to provide a 3 decibel gain. In this way, the overall gain provided by the amplifier configuration of FIG. 2 can be adjusted to one of two different levels depending on the resistance of the connected telephone loop.

Figure 3:
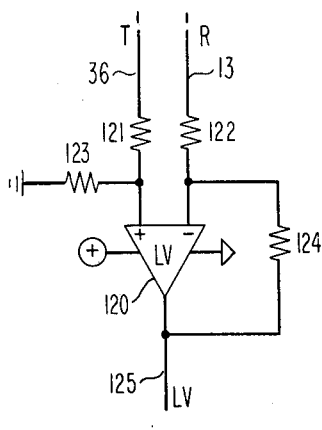
FIG. 3 is a detailed circuit diagram of a loop voltage sensor useful in the range extender of FIG. 1.

In FIG. 3 there is shown a circuit diagram of the loop voltage sensor 33 of FIG. 1. The voltage sensor of FIG. 3 comprises a differential amplifier 120 having a positive and a negative input. The tip conductor 36 is connected via voltage divider 121-123 to the positive input of amplifier 120. The ring conductor 13 is connected through resistor 122 to the negative input of amplifier 120. A negative feedback resistor 124 is connected from the output of amplifier 120 on lead 125 to the negative input of amplifier 120.

In operation, the voltage on tip conductor 36 is applied to the positive input of amplifier 120. The voltage on ring conductor 13 is applied across the voltage divider comprising resistors 122 and 124 to the negative input of amplifier 120. Resistor 124 provides negative feedback which determines the amplifier gain. The output of amplifier 120 on lead 125 is linearly proportional to the voltage between conductors 36 and 13 and has a polarity corresponding to the polarity of the voltage (ring volts with respect to tip volts) between conductors 36 and 13 within the voltage swing permitted by the amplifier and its power supplies.

Figure 4:
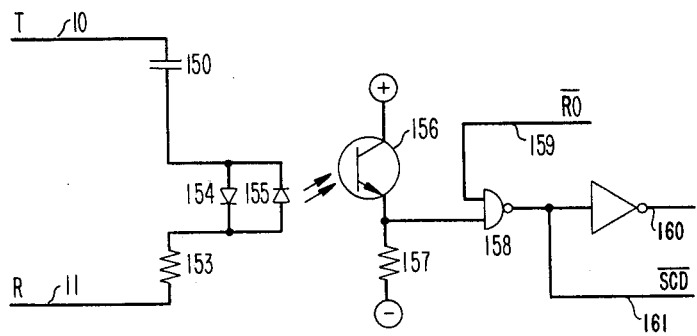
FIG. 4 is a detailed circuit diagram of a ringing signal detector useful in the range extender of FIG. 1.

In FIG. 4 there is shown a ringing signal detector which may be used as ringing detector 14 in FIG. 1. In FIG. 4, tip conductor 10 is connected through a direct current blocking capacitor 150, across LEDs 154 and 155, and resistor 153 to ring conductor 11. Capacitor 150 serves to isolate the ringing detector from direct current voltages. The current flow through the two oppositely poled light-emitting diodes (LEDs) 154 and 155 in the presence of a ringing signal causes LEDs 154 and 155 to be energized. These diodes emit visible light which is detected by photo-sensitive transistor 156. When enabled by a light input, the collector-emitter path of transistor 156 is enabled to provide a different voltage drop across resistor 157. This voltage is applied to NAND gate 158 together with a signal on lead 159 which indicates that RO relay 17 is not operated. NAND gate 158 is therefore fully enabled only when a ringing signal is present on leads 10 and 11 and the RO relay is not operated, indicating that the range extension circuits have not been switched into the subscriber circuit and that central office ringing has commenced. The output of NAND gate 158 appears on lead 160 and SCD lead 161. As will be described in connection with FIG. 8, this signal is used to modify the loop current detection circuitry in the presence of ringing signals for the purpose of more readily detecting ring-trip currents.

Figure 5:
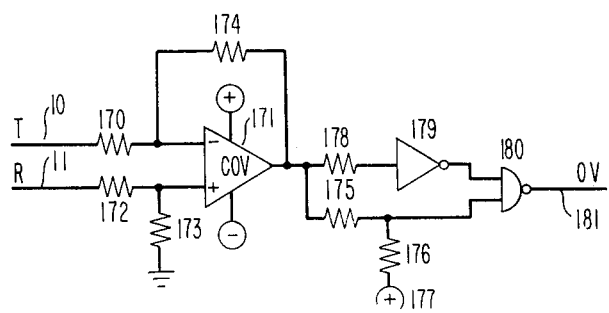
FIG. 5 is a detailed circuit diagram of a central office voltage detector useful in the range extender of FIG. 1.

In FIG. 5 there is shown a detailed circuit diagram of the central office voltage detector 12 of FIG. 1 which is connected between tip conductor 10 and ring conductor 11. Tip conductor 10 is connected through resistor 170 to the negative input of differential amplifier 171, while ring conductor 11 is connected to a voltage divider comprising resistors 172 and 173. The junction of resistors 172 and 173 is connected to the positive input of amplifier 171. Feedback resistor 174 is connected from the output of amplifier 171 to the negative input. As previously discussed in connection with FIG. 3, amplifier 171 provides an output signal linearly related to the voltage between conductors 10 and 11, both in magnitude and in polarity.

The output of amplifier 171 is connected through resistors 175 and 176 to positive voltage source 177. The output of amplifier 171 is also connected through resistor 178 and inverter circuit 179 to one input of NAND gate 180. The junction of resistors 175 and 176 is connected to the other input of gate 180. Resistors 175 and 176 and gate 180 establish a voltage threshold referenced to leads 10 and 11 of about 10 volts. Similarly, resistor 178 and inverter 179 establish a voltage threshold of about 10 volts for the other polarity of central office voltage appearing across conductors 10 and 11. The output of NAND gate 180 is therefore a binary or two-state output on lead 181 which indicates that the ±10-volt threshold level between conductors 10 and 11 has been exceeded. This threshold is set to detect the loss of the normal central office battery voltage which occurs just prior to the operation of the central office switching crosspoints. In applications such as that shown in FIG. 9, all voltages are removed from the tip and ring conductors prior to each switching operation so that the switching elements do not have to interrupt or initiate current flows as they are operated (i.e., they are operated "dry"). The output of the detector in FIG. 5 on lead 181 is therefore used to rapidly release both L relay 16 and RO relay 17, thereby removing the range extension circuitry from the circuit during central office switching. The manner in which this is accomplished will be discussed in more detail in connection with FIG. 7.

Figure 6:
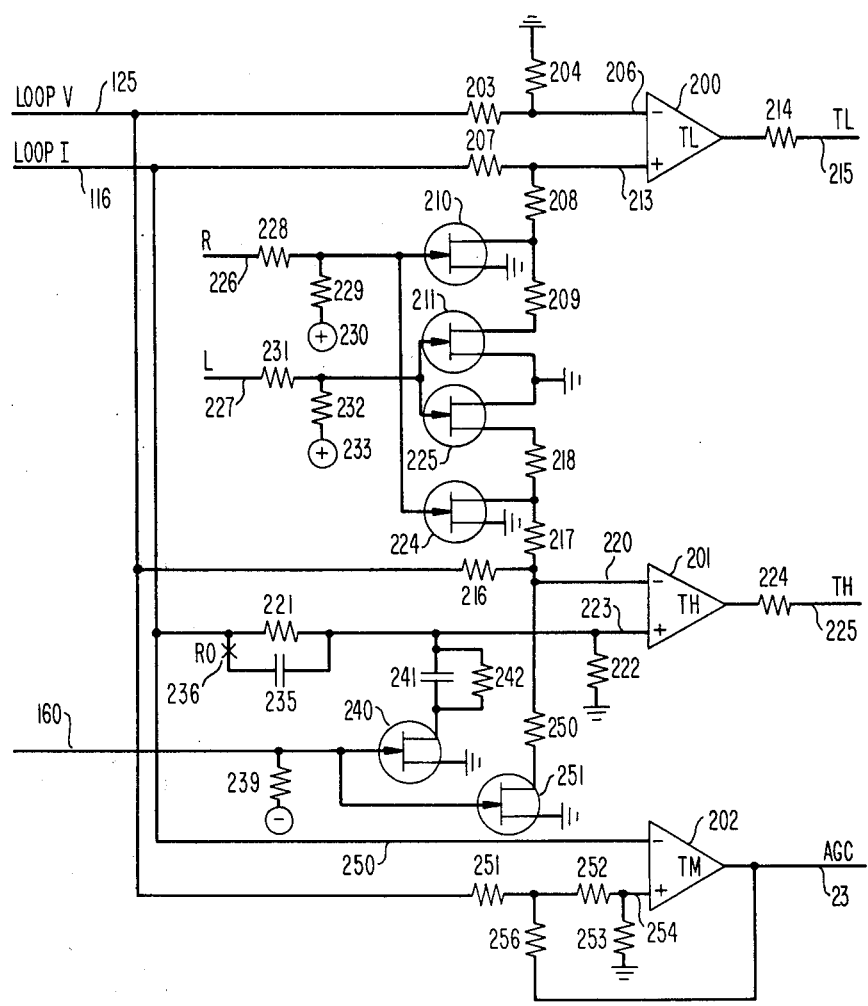
FIG. 6 is a detailed circuit diagram of a three-level resistance detector useful in the range extender of FIG. 1.

In FIG. 6 there is shown a detailed circuit diagram of a three-level loop resistance detector. The resistance detector of FIG. 6 responds to the loop current sensor 34, shown in FIG. 1, the output of which appears on conductor 116 in FIG. 6, and the output of the loop voltage sensor of FIG. 3, the output of which appears on lead 125 in FIG. 6. The detector of FIG. 6 comprises three differential amplifiers 200, 201 and 202. Each of these amplifiers is arranged to detect a different resistance level for either polarity of central office battery voltage. Amplifier 200, for example, is designed to detect loop resistances which are less than 1700 ohms (the low resistance threshold). Amplifier 201 is arranged to detect loop resistances that exceed a high threshold of 4300 ohms and amplifier 202 is arranged to detect resistances exceeding a medium threshold of 2200 ohms.

The loop voltage signal appearing on input lead 125 is applied across a voltage divider including resistors 203 and 204 to ground potential. The junction of resistors 203 and 204 is connected to the negative input 206 of amplifier 200. The loop current signal on lead 116 is similarly connected across a voltage divider including resistors 207, 208 and 209 to ground potential via FET 210 or FET 211. The junction of resistors 207 and 208 and connected to the positive input 213 of amplifier 200. It can be seen that the operation of FET 210 or FET 211 alters the voltage division ratio, thereby changing the portion of the signal on lead 116 which is applied to input 213 to obtain a threshold hysteresis which is under the control of the logic circuit. The output of amplifier 200 is applied through resistor 214 to output lead 215.

In operation, amplifier 200 serves as a comparator which compares the voltages at inputs 206 and 213. The resistance of the connected telephone loop is the ratio of the loop voltage on lead 125 and the loop current on lead 116. The threshold occurs for amplifier 200 when the signals on leads 206 and 213 are approximately equal. It can easily be seen that the threshold of operation of amplifier 200 is controlled by the voltage division ratios and, moreover, is independent of the magnitude or polarity of the actual loop voltage. This property is important for subscriber loops which may have differing office voltages applied to them, such as normal office voltage (−48 volts), reversed voltages and boosted voltages (−78 volts). At midrange and higher resistance values, amplifier 200 is not activated. If the loop resistance falls below the predetermined threshold (1700 ohms), amplifier 200 operates to provide a change in output signal on lead 215.

Amplifier 201 operates in essentially the same manner but with important differences due to the FET circuits being connected to the voltage input rather than the current input as was the case for amplifier 200. The signal indicating loop voltage on lead 125 is applied through a voltage divider including resistors 216, 217 and 218 to ground potential via FET 224 or FET 225. The junction of resistors 216 and 217 is applied to the negative input 220 of amplifier 201. The signal indicating loop current on lead 116 is applied through a voltage divider including resistors 221 and 222 to ground potential. The junction of resistors 221 and 222 is applied to the positive input 223 of amplifier 201. FETs 224 and 225 are used to control the voltage division ratio of signals applied to the negative input 220 of amplifier 201. The output of amplifier 201 is applied through resistor 224 to output lead 225.

Amplifier 201 changes output state when the loop resistance crosses the upper threshold (4300 ohms). The thresholds of both amplifier 200 and amplifier 201 are modified by means of control signals on leads 226 and 227, generated when RO relay 17 or L relay 16 is operated, as will be described in connection with FIG. 7. The signal on lead 226 is applied across a voltage divider including resistors 228 and 229 to positive voltage source 230. The junction of resistors 228 and 229 is connected to the control electrodes of FETs 210 and 224. Similarly, the control signal on lead 227 is applied to a voltage divider including resistors 231 and 232 to a positive voltage source 233. The junction of resistors 231 and 232 is connected to the control electrodes of FETs 211 and 225.

In operation, the control signals on leads 226 and 227, in combination with FETs 210, 211, 224 and 225, alter the thresholds of amplifiers 200 and 201 to provide hysteresis in the threshold characteristic. That is, once amplifier 200 or amplifier 201 has changed its output state and has, in turn, operated L relay 16 or RO relay 17, the thresholds are adjusted so that thes amplifier outputs will not change back to the former state until the input resistance reaches a different threshold. This prevents the amplifier outputs from cycling between high and low states the loop resistances near the threshold values.

A gate-by-gate explanation of the logic circuit operation is given later; a brief abstract is presented here to illustrate the overall operation. Since the polarities of the loop voltage and loop current are important to successful operation and since, for a given threshold, i.e., TH, only one amplifier (such as amplifier 201) is used to provide the threshold for dual-polarity detection, logic circuits connecting to the amplifier process the amplifier output along with inputs which come from the loop voltage detector amplifier 120. The logic circuit output to resistors 305 and 317 is low for either polarity of voltage which is greater than about 10 volts as seen at the loop voltage detector when the loop resistance is less than the threshold level of the amplifier 201. The following table summarizes the loop voltage detector and loop current detector inputs to the TH amplifier and the logic circuit and shows the output logic level for each set of inputs.

TABLE

| Loop Voltage Sign | Loop Voltage Magnitude | Loop Current Sign | Sign of TH Amplifier Input 223 (Ref = Input − 220) | Logic Output to R305 & R317 |
|---|---|---|---|---|
| − | >10V | − | + | HIGH |
| − | >10V | − | − | LOW |
| + | >10V | + | − | HIGH |
| + | >10V | + | + | LOW |
| − | <10V | − | + | HIGH |
| − | <10V | − | − | HIGH |
| + | <10V | + | − | HIGH |
| + | <10V | + | + | HIGH |
| − | >10V | + | + | HIGH |
| + | >10V | − | − | HIGH |

A dial pulse detection circuit is connected across resistor 221. A capacitor 235 is connected in parallel with resistor 221 by the contact 236 of RO relay 17 (FIG. 1). In operation, RO relay 17, and hence RO contact 236, operates in response to an off-hook signal received from the subscriber end of the loop. Dial pulses are represented by transitions between loop resistances of a low value (closed circuit) and loop resistances of a high value (open circuit). However, since the capacitance of the telephone loop must be charged or discharged on each dial pulse transition, the apparent loop resistance rises rather slowly when the dial contacts open and the line capacitance is charged. An oscillatory effective resistance is produced when the dial contacts open the loop and the line also charges the ringer circuit. In order to accurately track dial pulses, it is therefore desirable to provide a high resistance threshold when the dial contacts close the loop and a much lower threshold when the dial contacts open the subscriber loop. This variable threshold provides more accurate detection of the transition times and avoids false indications (split pulses) due to oscillatory peaks in the line resistance by providing a controlled rate of transition from one threshold to the other which masks the ringer charging current oscillations. Capacitor 235 is charged prior to the dial contact opening and thus provides the lower resistance threshold for amplifier 201. When the dial contact closes, capacitor 235 charges through resistor 222 to provide the higher resistance threshold for amplifier 201. Thus, when the dial pulse terminates, a new and higher threshold is provided to amplifier 201 and the dial pulse's termination is detected at a different threshold than the dial pulse initiation. Moreover, the shift is threshold is proportional to the loop current, thus tending to track the dial pulse amplitude.

Amplifier 201 is also used to provide an indication of ring trip. That is, amplifier 201 must detect the current flow due to the operation of the subscriber's switchhook when he goes off-hook in response to ringing signals. This requires a relatively small direct current to be detected in the presence of the alternating high voltage and high current 20 Hz ringing signals. When ringing occurs, as indicated by ringing detector 14 (FIG. 1), the inhibit signal on lead 160 (FIG. 6) is removed from across resistor 239 and the control electrodes of FETs 240 and 251. FETZ 240 therefore operates to connect a capacitor 241 from positive input 223 of amplifier 201 to ground potential. Capacitor 241 filters out the large varying alternating current component on the subscriber loop caused by the ringing signals but slowly builds up a net charge due to the direct current signal, thereby permitting amplifier 201 and logic circuits (FIG. 7) to detect the small direct current off-hook signal with considerably greater sensitivity. A resistor 242 is connected across capacitor 241 to discharge capacitor 241 when it is not in use. FET 251 connects resistor 250 from input 220 of amplifier 201 to ground. This shifts the detection threshold to account for the lower superimposed direct current (38 volts versus 48 volts).

The ring-trip detection threshold is further defined by the design of the dynamic range of the loop voltage detector so that during ringing the output of the loop voltage amplifier 120 clips the peak of the larger (absolute magnitude) 20 Hz voltage crest. The clipping at the extremities of the loop voltage amplifier 120 output therefore provides a reference voltage for a portion of each 20 Hz cycle to measure the voltage output of the loop current detector against. Ring-trip detection, as a result, is a current threshold measurement rather than a resistance threshold measurement. The TH amplifier 201 and the logic circuits supply drive to resistors 305 and 317 when the dc component of the ringing circuitry exceeds the threshold of the amplifier 201 for a fraction of each 20 Hz cycle. Filtering in the RO relay logic circuit delays the RO relay operation. The L relay operation is fast enough to follow the LOW logic level inputs to its driver. The L relay operates during each high level voltage peak of the ringing voltage waveform. It follows then that the period L contact closures selectively aid the closure of the loop by causing rectified high current pulses to flow through diode 38 (FIG. 1) that reenforce the loop ring-trip signal. The logic circuits act, as detailed in the table, to track the instantaneous polarity of loop voltages during the ringing intervals to make ring-trip detection possible for either polarity of ring-trip battery when applied to either tip or ring conductors.

The loop current signal on lead 116 is also connected directly to the negative input 250 of amplifier 202. The loop voltage signal on lead 125 is applied through a voltage divider including resistors 251, 252 and 253 to ground potential. The junction of resistors 252 and 253 is connected to the positive input 254 of amplifier 202. The output of amplifier 202, appearing on lead 23, is connected through feedback resistor 256 to the junction of resistors 251 and 252. The signal on lead 23 controls the automatic gain control circuits of FIG. 2. The positive feedback through resistor 256 provides hysteresis and prevents undesirable gain changes caused by slight loop resistance fluctuation or 60 Hz noise pickup.

The detector of FIG. 6 detects subscriber loop resistances in four different ranges separated by three different thresholds. The highest range, aboe the highest threshold (TH) of amplifier 201 (>4300 ohms), indicates an open circuit and is used to detect the off-hook or dial pulse condition. The next lower range, between the medium threshold (TM) of amplifier 202 and the high threshold (2200 through 4300 ohms), indicates a long subscriber loop which requires a 6 decibel gain in the amplifier of FIG. 2. The next lower range (1700 through 2200 ohms) indicates an intermediate length loop requiring a 3 decibel gain in the amplifier of FIG. 2. The lowest range (below 1700 ohms) indicates a loop which is short enough so as not to require range extension at all. In this case, L relay 16 and RO relay 17 are both released and the range extender circuits are disconnected from the subscriber loop. The high threshold (amplifier 201) is also used for ring-trip and dial pulse detection.

Figure 7:
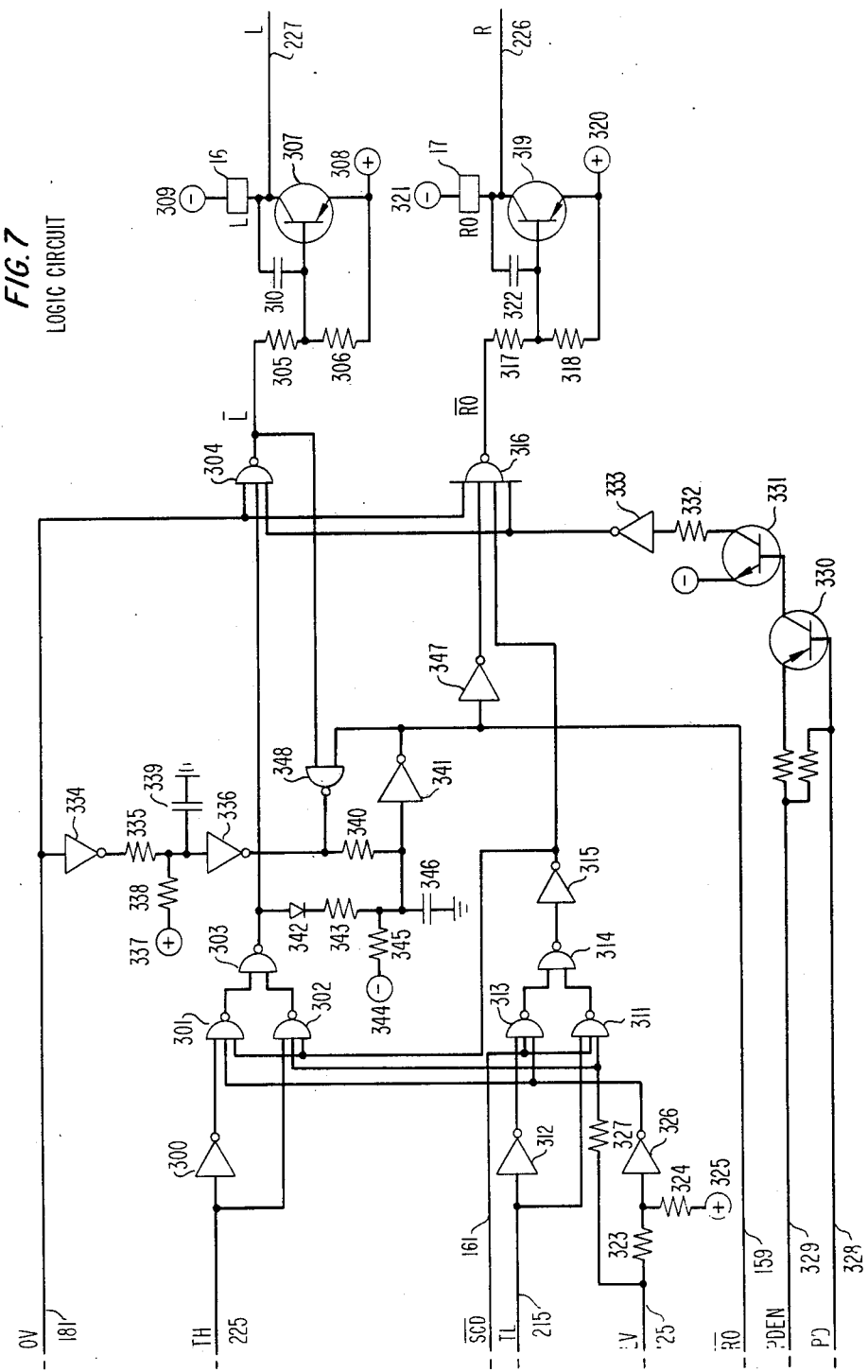
FIG. 7 is a detailed circuit diagram of a common logic circuit useful in the range of FIG. 1.

In FIG. 7 there is shown a detailed circuit diagram of the common logic circuit 15 of FIG. 1. The output of the central office voltage detector of FIG. 5 is supplied on lead 181 to the circuit of FIG. 7. The output of the high resistance threshold detector 201 of FIG. 6 is applied on lead 225. The output of the low resistance threshold detector 200 of FIG. 6 appears on input lead 215. The output of the loop voltage sensor of FIG. 3 appears on input lead 125.

The signal on lead 225 from the high threshold resistance detector is applied through inverter circuit 300 to NAND gate 301 and is applied directly to NAND gate 302. The outputs of NAND gates 301 and 302 are applied to NAND gate 303, the output of which is applied to NAND gate 304. The output of NAND gate 304 is applied to a voltage divider comprising resistors 305 and 306, the junction of which is connected to the base of transistor 307. Transistor 307 has its emitter connected to positive voltage source 308 and its collector connected through the coil of L relay 16 to negative voltage source 309. A capacitor 310 is connected between the base and collector of transistor 307.

The output of NAND gate 303 is also applied through a delay circuit comprising diode 342, resistor 343 and capacitor 346 to inverter 341. The input to inverter 341 is normally biased from negative source 344 through resistor 345 to provide a negative input to inverter 341. The positive output of inverter 341 is again inverted by inverter 347 and applied to NAND gate 316. NAND gate 316 therefore cannot be fully enabled until capacitor 346 is charged positive by the output of NAND gate 303 when the high threshold is reached. This insures a delay in the operation and release of RO relay 17, thereby holding RO relay 17 operated as L relay 16 tracks dial pulses.

The signal on lead 215, representing the low resistance threshold, is supplied directly to NAND gate 311 and through inverter 312 to NAND gate 313. The outputs of NAND gates 311 and 313 are applied to NAND gate 314, the output of which is connected through inverter 315 to NAND gate 316 and also comprises one input to NAND gates 301 and 302. The output of NAND gate 316 is applied to a voltage divider including resistors 317 and 318, the junction of which is connected to the base of transistor 319. The emitter of transistor 319 is connected to positive voltage source 320 while the collector of transistor 319 is connected through the coil of RO relay 17 to negative voltage source 321. A capacitor 322 is connected from the base to the collector of transistor 319.

An output from NAND gate 314 indicates that the line resistance is below the lower threshold. This signal is inverted in inverter 315 and used to disable RO relay 17 (via NAND gate 316) and to disable L relay 16 (via NAND gates 301 and 302). Both L relay 16 and RO relay 17 are also disabled by the signal on lead 181, indicating that the office voltage has been removed and hence switching of the line is about to take place. Relays 16 and 17 are therefore released to permit "dry" switching by the central office crosspoints.

The loop voltage signal on lead 125 is connected across a voltage divider comprising resistors 323 and 324 to positive voltage source 325. The junction of resistors 323 and 324 is connected through inverter 326 to the remaining input of NAND gate 301 and to the remaining input of NAND gate 313. The loop voltage signal on lead 125 is also supplied through resistor 327 to the remaining input of NAND gate 302 and to the remaining input of NAND gate 311.

It will be recalled that the sensors 33 and 34 of FIG. 1 provide linear outputs representing voltage and current, respectively, on the subscriber loop. Moreover, these voltages and currents can be of either polarity. The threshold detectors of FIG. 6 are therefore also arranged to respond to signals of either polarity and to produce outputs the significance of which is inverted when the polarity of the inputs is inverted. In order to avoid the necessity of providing separate threshold detectors for these opposite polarities, the logic of FIG. 7 is adjusted by a polarity-indicating signal on lead 125. If the line voltage is positive, for example, NAND gates 302 and 311 are enabled via resistor 327. If the line voltage is negative, NAND gates 301 and 313 are enabled via inverter 326. In this way, the NAND gates 303 and 314 respond correctly to the magnitude indication on leads 225 and 215, respectively, regardless of their polarity. For positive magnitudes, NAND gates 301 and 314 are operated through NAND gates 302 and 311, respectively, while for negative magnitudes, NAND gates 301 and 314 are operated through NAND gates 301 and 313, respectively. Since the additional logic is much cheaper and more compact than would be the additional threshold detectors, the arrangement shown in the Figures is preferable.

Additional inputs to gates 311 and 313 from $\overline{SCD}$ lead 161 inhibit the effects of signals on lead 215 from TH amplifier 200 from interfering with ring tripping. Without the inhibit function, high level ringing currents could be detected by the TH amplifier and the logic circuit would then act to prevent the L and RO relays 16 and 17 from operating following a TH set off-hook response to ringing because the TH amplifier does not have a switchable low-pass filter that is similar to the filter on the input of the TH amplifier that removes the 20 Hz current.

A signal on lead 328, when appearing in combination with a positive operate voltage on lead 329, operates transistors 300 and 331 to provide an output signal through resistor 332 and inverter 333 to one input of NAND gate 304 and to one input of NAND gate 316. The signals on leads 328 and 329 permit the telephone switching machine to disable relays 16 and 17 independent of the line conditions. This relay control is used for one type of concentrated range extension where the switching machine itself detects all dial pulsing and ring tripping while the range extender is held in a bypass condition. Other types of switching machines do not have this capability and the range extender is automatically released via detector 12 and lead 181.

The office voltage signal on lead 181 is applied to one input of NAND gate 304 and to one input of NAND gate 316 to disable relays 16 and 17 if office voltage is lost. The signal on lead 181 is also applied through inverter 334 and resistor 335 to the input of inverter 336. The input to inverter 336 is biased from positive voltage source 337 through resistor 338 and is connected to ground potential through capacitor 339. The output of inverter 336 is supplied through resistor 340 to capacitor 346. The signal on lead 181 therefore discharges capacitor 346 to reset the delay timing circuit. As previously noted, the output of inverter 341 is applied through inverter 347 to one input of NAND gate 316. The output of inverter 341 also comprises the control signal on lead 159 used to enable the output of the ringing detector of FIG. 4. The output of inverter 341 is also combined with the output of NAND gate 304 in NAND gate 348. The output of NAND gate 348 is connected so as to rapidly discharge capacitor 346, thus resetting the timing delay circuit in the operate circuit of relay 17.

Leads 226 and 227 provide hysteresis for the loop resistance detector functions of the TL and TH comparators 200 and 201 of FIG. 6. Hysteresis changes the magnitude of the resistance thresholds so as to provide nonpolarity sensitive feedback around the loop consisting of the TH (and TL) comparator, the logic and relays of FIG. 7, the actual loop cable impedance and sensors 33 and 34. With nonpolarity sensitive feedback, The TH comparators will require an approximately 50 percent change in loop resistance after having switched to one state before it will switch back. This hysteresis makes the circuit insensitive to noise or cable temperature changes.

Figure 8:
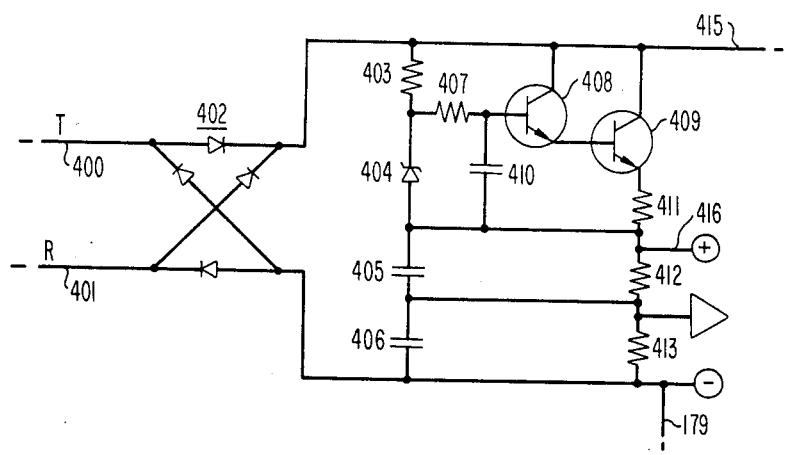
FIG. 8 is a detailed circuit diagram of a power supply useful in the range extender of FIG. 1.

In FIG. 8 there is shown a detailed circuit diagram of the power supply 21 of FIG. 1. Tip conductor 400 and ring conductor 401 are connected to a full-wave rectifier (polarity guard) 402. Across the output of guard 402 is a series circuit including resistor 403, zener diode 404 and capacitors 405 and 406. The junction between resistor 403 and zener diode 404 is connected through resistor 407 to the base of a Darlington pair of transistors 408 and 409. A capacitor 410 is connected from the base of transistor 408 to the junction of zener diode 404 and capacitor 405. The emitter of transistor 409 is connected through a voltage divider comprising resistors 411, 412 and 413 to the negative voltage supply 179. The collectors of transistors 408 and 409 are connected to lead 415. Voice frequency signals are connected to the bilateral amplifier 22 of FIG. 1 by way of leads 415 and 179.

In operation, the rectifier 402 translates the direct current voltages appearing at the central office appearances 10 and 11 (FIG. 1) into a unidirectional voltage having a polarity positive on lead 415 and negative on lead 179. Zener diode 404 provides a reference voltage to bias transistors 408 and 409 to a preselected operating point which delivers a current of known magnitude to the voltage divider including resistors 411, 412 and 413. Resistor 407 and capacitor 410 remove voice frequency alternating current components from the control signal delivered to the base of transistor 408. Capacitors 405 and 406 smooth the direct current voltages appearing across their terminals. The junction of resistors 411 and 412 provides a positive voltage on lead 416 which can be used as a positive power supply for the bidirectional amplifier of FIG. 2 The midpoint of resistors 412 and 413 is grounded to a local ground, and the voltage on lead 179 acts as a negative voltage supply for the bidirectional amplifier. It will be noted that polarity guard 402 is biased heavily "on" and therefore provides a very low impedance path for voice frequency signals from leads 400 and 401 to leads 179 and 415. The power supply of FIG. 8 powers only the bidirectional amplifier of FIG. 2. The balance of the circuits is powered from the central office battery.

In FIG. 9 there is shown a block diagram of the manner in which range extenders of the form shown in FIG. 1 can be connected behind the first or concentrator switching stages of a central office switch. Thus, range extenders 450 are connected between switching stage 451 and later stages of switching (not shown) to provide concentrated range extension of the subscriber loops 452. Since range extenders 450 automatically adapt to loops of varying resistances, it is possible to connect a wide variety of subscriber loops 452 to switch 451. Moreover, since switch 451 concentrates traffic from loops 452, a smaller number of range extenders 450 are required with the arrangement of FIG. 11 than would be required if each of subscriber loops 452 were separately equipped with a range extender. It is to be understood, however, that individual ones of loops 452 could nevertheless be equipped with a range extender of the form shown in FIG. 1. Individually connected range extenders would automatically adapt to the loops to which they were connected. It is therefore apparent that the range extender of the present invention is universally applicable in the telephone plant and is particularly useful when used behind the early switching stages of a central office switch. Moreover, in view of the range extender's ability to rapidly disconnect during the switching operation, the range extender of the present invention is also suitable for use in electronic central office switches.

I claim:

1. A subscriber loop resistance detector including a loop voltage sensor and a loop current sensor, said resistance detector
characterized by
a differential amplifier having two inputs and a single output,
means coupling said loop voltage sensor to one of said inputs,
means coupling said loop current sensor to the other of said inputs, and
means responsive to said output for modifying at least one of said coupling means.

2. The subscriber loop resistance detector according to claim 1 further
characterized by
logic circuit means responsive to said loop voltage sensor for inverting the output of said differential amplifier in response to polarity changes in said loop voltage.

3. The subscriber loop resistance detector according to claim 1 further
characterized by
a feedback resistor connecting said output to one of said inputs.

4. The subscriber loop resistance detector according to claim 1 further
characterized in that
said coupling means includes a relay circuit, and
said modifying means is responsive to the operation of said relay circuit.

5. A relay control circuit including a relay driver circuit, a relay coil, a switching transistor, means connecting said driver circuit to the base of said transistor, and means for connecting said relay coil to the collector of said transistor, said control circuit
characterized by
a capacitor, and
means for connecting said capacitor between said base and said collector.

6. The relay control circuit according to claim 5 further
characterized by
means for detecting the energization of said relay coil, and
means responsive to said detecting means for altering said driver circuit.

7. A subscriber loop resistance detector
characterized by
three differential amplifiers each having one output and two inputs,
a voltage sensor for providing one input to each of said amplifiers,
a current sensor for providing the other input to each of said amplifiers, and
adjustable voltage dividers connected between said sensors and said inputs and responsive to said outputs.

8. The resistance detector according to claim 7 further
characterized by
a plurality of relay control circuits responsive to said outputs, each of said relay control circuits comprising
a relay coil,
a switching transistor,
means connecting said driver circuit to the base of said transistor,
means connecting said relay coil to the collector of said transistor, and
a capacitor connected between said base and said collector.

9. The resistance detector according to claim 7 further
characterized by
logic circuit means responsive to said voltage sensor of inverting the output of at least two of said differential amplifiers in response to polarity changes in said loop voltage.

10. The resistance detector according to claim 7 further
characterized by
a feedback resistor connecting the output of at least one of said amplifiers to one input of said one amplifier.

* * * * *

UNITED STATES PATENT AND TRADEMARK OFFICE
CERTIFICATE OF CORRECTION

PATENT NO. : 4,282,407
DATED : August 4, 1981
INVENTOR(S) : Kenneth E. Stiefel

It is certified that error appears in the above—identified patent and that said Letters Patent is hereby corrected as shown below:

Column 1, line 18, "of" should read --on--.
Column 2, line 30, after "range" add --extender--;
         line 36, first occurrence, "of" should read --for--.
Column 3, line 20, "26" should read --36--;
         line 31, "resistance" should read --resistances--;
         line 60, "amplifications" should read --amplification--.
Column 4, line 36, "it" should read --its--;
         line 41, "reistors" should read --resistors--;
Column 7, line 6, "and" should read --is--.
Column 8, line 1, "thes" should read --these--;
         line 5, "the" first occurrence should read --for--.
Column 9, line 5, first occurrence, "is" should read --in--;
         line 18, "FETZ" should read --FET--;
         line 52, "period" should read --periodic--.
Column 10, line 8, "aboe" should read --above--.
Column 11, line 64, "300" should read --330--.
Column 13, line 5, after "2" add --.--.

Signed and Sealed this

Twenty-seventh Day of July 1982

[SEAL]

Attest:

GERALD J. MOSSINGHOFF

Attesting Officer          Commissioner of Patents and Trademarks